W. H. WHITE.
Milk Cooler.

No. 202,129.  Patented April 9, 1878.

WITNESSES
George H. Perkins
Joshua W. Farrington

INVENTOR
Wm. H. White
by his attorney
J. L. Newton

UNITED STATES PATENT OFFICE.

WILLIAM H. WHITE, OF BARRE, MASSACHUSETTS.

IMPROVEMENT IN MILK-COOLERS.

Specification forming part of Letters Patent No. 202,129, dated April 9, 1878; application filed January 18, 1878.

*To all whom it may concern:*

Be it known that I, WILLIAM H. WHITE, of Barre, in the county of Worcester and State of Massachusetts, have invented Improvements in Milk-Coolers, of which the following is a specification:

My invention has two basins—an outer basin or jacket and an inner basin or milk-pan.

The improvements herein claimed consist in the means by which or manner in which the cooling of the milk is accomplished, the method of making the milk-pan air-tight, and of ventilating the same when necessary.

Figure 1:
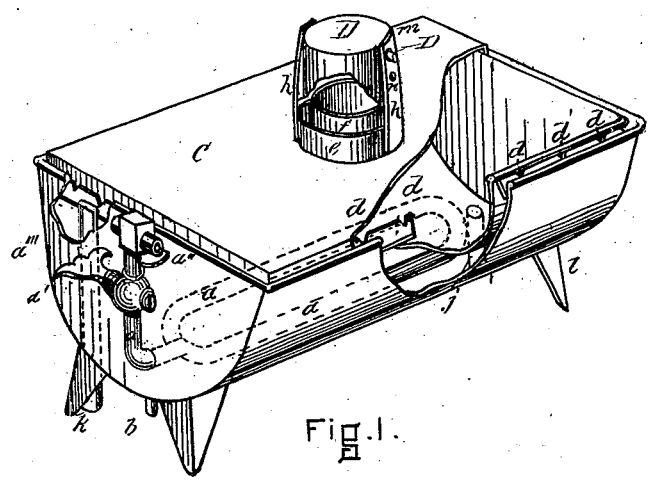
Figure 2:
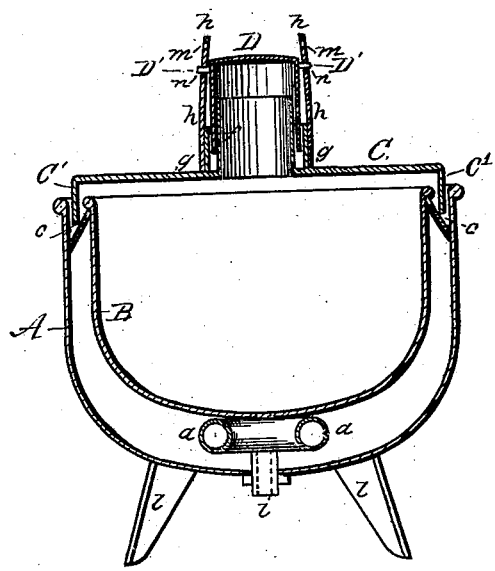

The accompanying drawings, which are made part of this specification, will explain my improvements, in which Figure 1 shows an elevation of the cooler, and Fig. 2 a cross-section of the same.

The letter A in the drawings represents the outer basin or jacket, standing upon ordinary supports or legs $l\ l$. This basin has joined to it, and near its bottom, a pipe, $a\ a$, which passes through one end of the basin, having on the outside of said basin a stop-cock, $a'$, and nozzles $a''\ a'''$, as seen in Fig. 1. The pipe also, within the basin, has orifices or holes in its lowest part, next the basin, through all its length, so that when water or steam is let into the pipe through the nozzles the steam or water will not spurt or strike against the milk-pan, thereby disturbing or cooling the milk in one part quicker than in another part, as would be the case if the holes were at the top of the pipe; or if the holes are at the sides of the pipe, the water would be disturbed and vary; but the holes being at the lowest part of the pipe, the water or steam spurts directly toward the bottom of the basin, and then flows evenly up around the sides of the milk-pan, cooling or affecting all its parts alike. The jacket A has also a trough, $c$, going around its sides at the top. (Shown in Figs. 1 and 2.) The inner edge of the trough $c$ has notches, holes, or perforations $d\ d\ d$, so that when the water flows up and fills the space between the jacket and the milk-pan it runs through these notches into and fills the trough $c$.

B represents a milk-pan, shaped like the jacket A. It sits into the jacket, its rim resting upon the edge of the trough $c$, and its bottom upon the pipe $a$. It has a conducting-pipe in its bottom, through which the milk is drawn off.

C represents the cover of the milk-pan, the flange of which, $C'$, shuts into the trough $c$.

D represents the cover of the ventilator on the cover of the milk-pan.

There are two rims, $e$ and $f$, around the ventilation-hole of the cover of the milk-pan, which, together with pan-cover, form a trough, $g$, upon said pan-cover.

In the uprights $h\ h$ are corresponding holes $m\ m\ n\ n$. When the pivots are in the holes $m\ m$ there is ventilation to the milk-pan. When the trough $g$ is full of water, and the pivots are in the holes $n\ n$, the ventilator is made air-tight.

By removing the cover D the milk can be inspected without removing the milk-pan cover C.

The process of heating the milk in the pan to expel the animal odor by means of steam or hot water is the same as the process of cooling the milk after the odor has been expelled.

When the pan is filled with milk and the cover adjusted, the method of heating and cooling the milk, of making the milk-pan air-tight, and of ventilating the same will be readily understood.

I do not claim, broadly, letting water or steam through a pipe into the bottom of the outer basin or jacket; but my device for inletting water or steam from the lowest part of the pipe has both novelty and a useful, practical result in a milk-cooler; and

What I claim as my invention, and desire to secure by Letters Patent, is—

1. The combination of the jacket A, having a trough, $c$, notched or perforated at $d$ at its upper edge, with the flange $C'$ of the milk-pan cover C, substantially as and for the purpose shown and described.

2. The combination of the milk-pan cover C with the ventilating-cover D, having pivots $D'\ D'$, the uprights $h\ h$, provided with holes therein, $m\ m\ n\ n$, and the trough $g$, composed of the rims $e$ and $f$, projecting from the cover C, substantially in the manner and for the purpose shown and described.

WILLIAM H. WHITE.

Witnesses:
T. H. WHITE,
J. C. BARTHOLOMEW.